US008214257B1

(12) United States Patent
Folk et al.

(10) Patent No.: US 8,214,257 B1
(45) Date of Patent: Jul. 3, 2012

(54) PROXY TRANSACTIONS AND DELEGATION OF TRANSACTION CAPABILITIES AND ROLES FOR A CASH HANDLING DEVICE

(75) Inventors: Amy Baker Folk, Charlotte, NC (US); Daniel Christopher Bohen, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 590 days.

(21) Appl. No.: 12/323,001

(22) Filed: Nov. 25, 2008

(51) Int. Cl.
*G06Q 20/00* (2012.01)
*G06F 7/04* (2006.01)
*G07G 1/00* (2006.01)
*G06Q 40/00* (2012.01)
*G07D 11/00* (2006.01)
*G07F 19/00* (2006.01)

(52) U.S. Cl. ............... 705/16; 726/16; 726/17; 235/7 R; 235/379; 705/35

(58) Field of Classification Search .................... 705/16, 705/35; 235/7 R, 382; 726/16, 17
See application file for complete search history.

(56) References Cited

U.S. PATENT DOCUMENTS

| 6,848,612 | B2 | 2/2005 | Uematsu et al. | |
|---|---|---|---|---|
| 6,983,836 | B2 | 1/2006 | Adams et al. | |
| 7,296,003 | B2* | 11/2007 | Mersky et al. | 705/75 |
| 7,386,471 | B1* | 6/2008 | Nack | 705/21 |
| 7,886,962 | B2* | 2/2011 | Vawter | 235/379 |
| 2001/0020638 | A1 | 9/2001 | Uematsu et al. | |
| 2001/0054643 | A1 | 12/2001 | Siemens | |
| 2003/0083969 | A1 | 5/2003 | Uchiyama et al. | |
| 2003/0120546 | A1* | 6/2003 | Cusack et al. | 705/16 |
| 2004/0230537 | A1* | 11/2004 | Kamonji et al. | 705/64 |
| 2005/0017066 | A1* | 1/2005 | Carter | 235/375 |
| 2005/0080731 | A1 | 4/2005 | Snyaneshwar | |
| 2005/0108164 | A1 | 5/2005 | Salafia et al. | |
| 2005/0209925 | A1* | 9/2005 | Ito | 705/16 |
| 2005/0211450 | A1* | 9/2005 | Carter | 172/111 |

(Continued)

FOREIGN PATENT DOCUMENTS

EP 1486923 12/2004
WO 2005038623 4/2005

OTHER PUBLICATIONS

Joe Davis. (2006). Retail Risk and High Technology. Risk Management, 53(6), 16-19. Retrieved Apr. 16, 2012, from ABI/INFORM Global. (Document ID: 1061343621).*

(Continued)

*Primary Examiner* — Scott Zare
(74) *Attorney, Agent, or Firm* — Banner & Witcoff, Ltd.; Michael A. Springs

(57) ABSTRACT

Financial transaction capabilities and roles may be delegated by one user to another user allowing a user to act as a proxy for the other user. Allowing one user to conduct transactions on behalf of another may increase efficiency by reducing potential downtime due to transporting funds, setting up and other time consuming tasks. In one or more configurations, a user may conduct transaction on behalf of another user without requiring explicit permission by the other user. The user conducting the transaction may be allowed to do so by virtue of his or her role or position. According to another aspect, roles may be delegated such that one employee may assume the role of another employee in a business. A role may include a set of transaction capabilities, authorizations, responsibilities and the like.

12 Claims, 12 Drawing Sheets

U.S. PATENT DOCUMENTS

| | | |
|---|---|---|
| 2006/0022032 A1 | 2/2006 | Fillinger et al. |
| 2007/0045395 A1 | 3/2007 | Corona et al. |
| 2007/0063016 A1 | 3/2007 | Myatt et al. |
| 2009/0064280 A1* | 3/2009 | Babeanu et al. ............ 726/3 |
| 2009/0276280 A1* | 11/2009 | Whitsitt et al. ............ 705/9 |
| 2010/0191625 A1* | 7/2010 | Oe et al. ............ 705/30 |

OTHER PUBLICATIONS

International Search Report and Written Opinion for International Application No. PCT/US2007/088650 mailed Sep. 16, 2008, 10 pages.

* cited by examiner

ZZZ BANK

800    TILL WITHDRAWAL TRANSACTION

Conduct transaction for:

805

| Choose one... ▽ |
| User 1 |
| User 2 |
| User 3 |
| User 4 |
| User 5 |

Authorization code: [        ] — 810

SUBMIT

BACK — 820

Logged in: User 7
Title: Manager          815          3:32:47 PM

PROXY TRANSACTIONS AND DELEGATION OF TRANSACTION CAPABILITIES AND ROLES FOR A CASH HANDLING DEVICE

BACKGROUND

Businesses and other organizations often require a supply of cash to fund transactions such as providing change for customer purchases. In some instances, such businesses and organizations use a cash handling device to provide an accessible cash supply. Occasionally, the supply of cash (e.g., specific denominations of currency) must be replenished. Typically, to replenish the supply of cash, a business will have to monitor a cash handling device and manually submit a request for more cash (i.e., a change order) to a financial institution.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

According to aspects of the present disclosure, a first user may perform transactions on behalf of a second user. For example, a manager at a retail store may obtain a till distribution on behalf of a cashier whose shift will be starting in the near future. Allowing the first user to conduct certain transactions on behalf of the second user may increase efficiency and productivity at a retail organization. A transaction log may store a record of the transaction, indicating that the transaction was performed on behalf of the second user by the first user. The transaction log may be pertinent in auditing the retail organization.

According to another aspect, a user may specify which transaction capabilities may be delegated to others and who may conduct transactions on behalf of that user.

According to yet another aspect, roles may be transferred or delegated between users. For example, a store manager may delegate his roles including his transaction capabilities to another user such as a shift supervisor if the store manager is going on vacation. In another example, role transfers may be performed if one employee is taking over a shift for another employee.

BRIEF DESCRIPTION OF THE DRAWINGS

The present disclosure is illustrated by way of example and not limited in the accompanying figures in which like reference numerals indicate similar elements.

FIGS. 7-9 illustrate example user interfaces through which a user may conduct transactions on behalf of another user according to one or more aspects described herein.

DETAILED DESCRIPTION

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), depository machines, dispensing machines, currency recyclers and the like. Currency recyclers generally refer to cash handling devices that are configured to dispense the same currency that was earlier deposited. For example, if a user deposits a five-dollar bill into a cash recycler machine, the same five-dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

Figure 1:
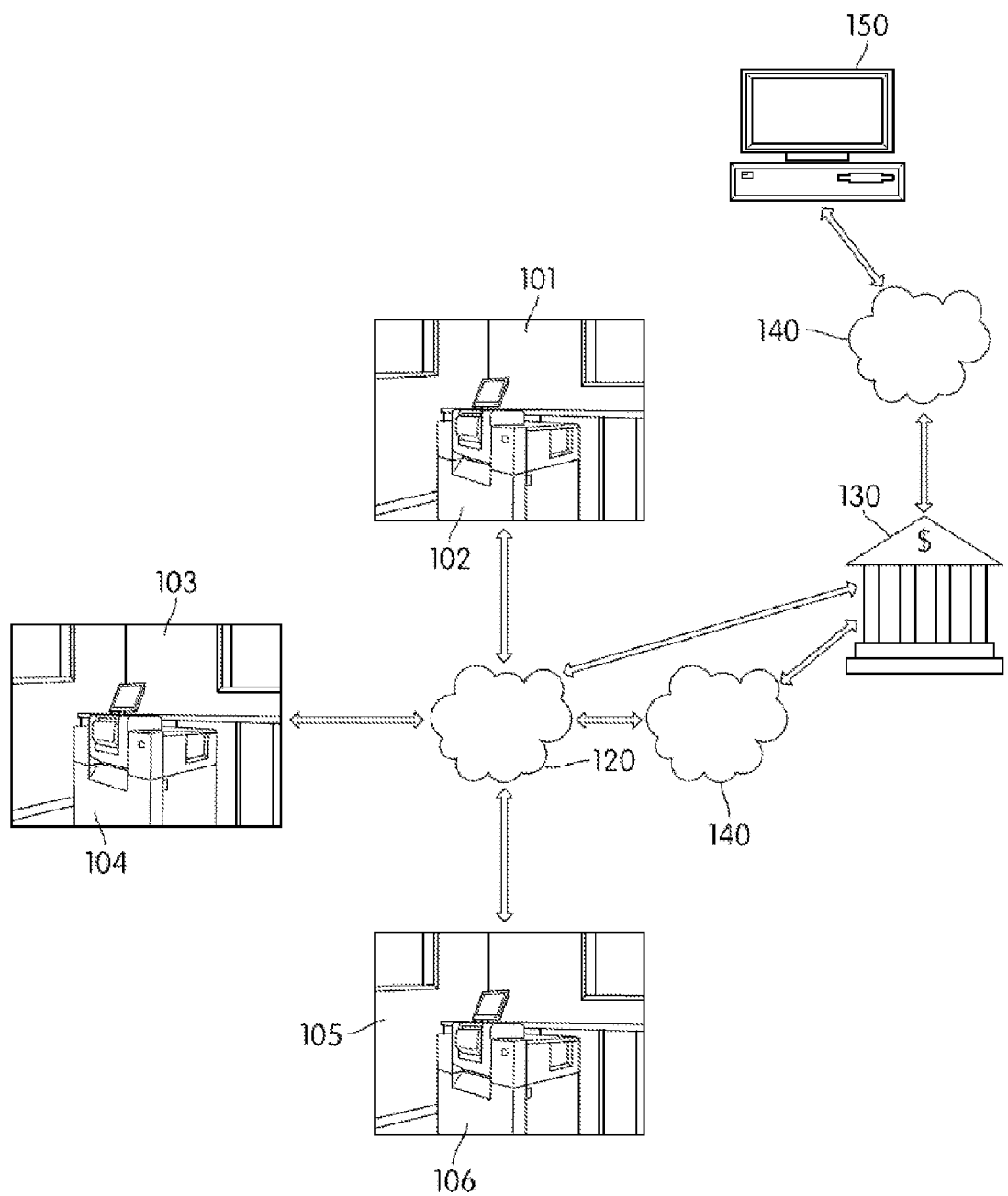
FIG. 1 illustrates an example of a suitable operating environment in which various aspects of the disclosure may be implemented.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 before being connected to bank 130. According to one or more arrangements, bank 130 may utilize an infrastructure which includes a server 150 having components such as a memory, a processor, a display, and a communication interface.

Figure 2:
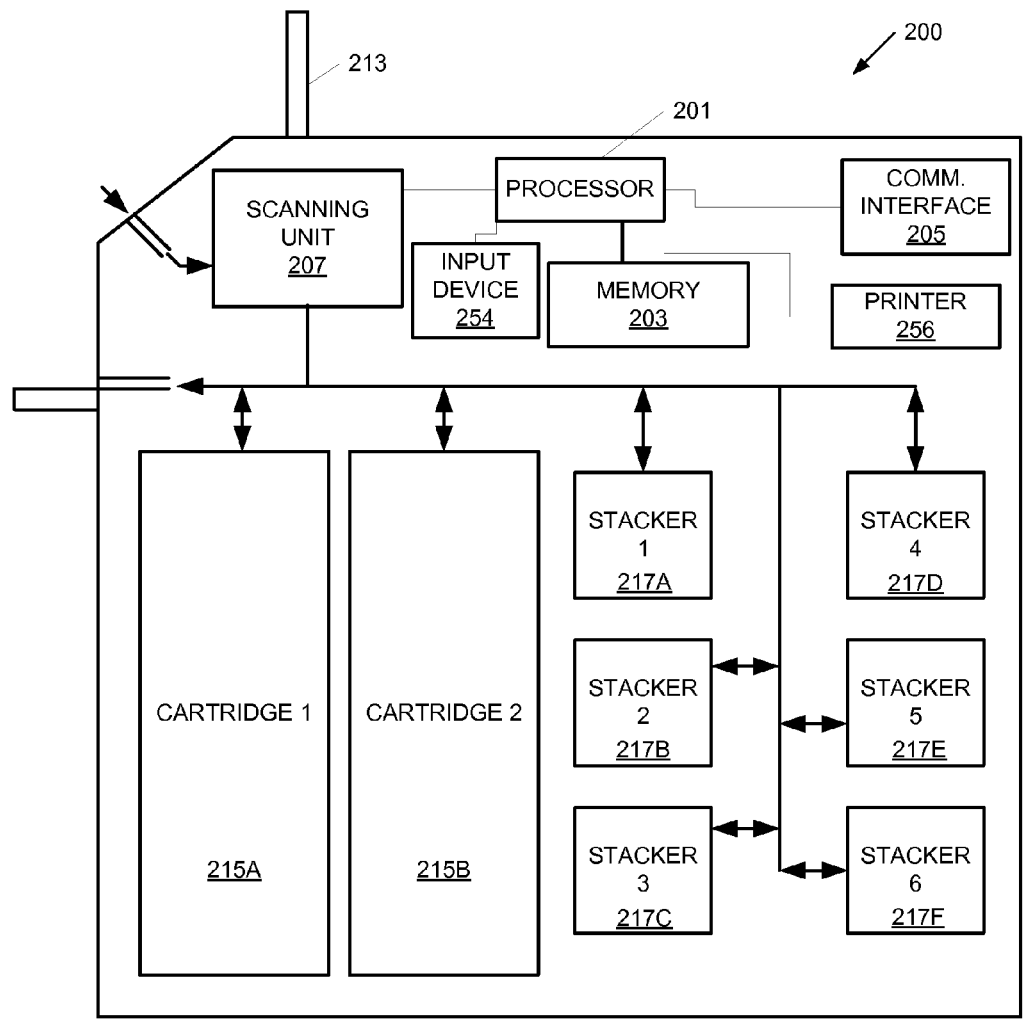
FIG. 2 illustrates a simplified diagram of a cash recycler that may be used in accordance with the operating environment of FIG. 1.

FIG. 2 illustrates a simplified diagram of a cash recycler that may be used in accordance with the operating environment of FIG. 1. Cash recycler 200 may include processor 201, memory 203, communication interface 205, scanning unit 207, display 213 and various cartridges 215 and recycling units such as stackers 217 or rolled stored modules (RSMs). Processor 201 may be generally configured to execute computer-readable instructions stored in memory 203 such that, for example, cash recycler 200 may send and receive information to and from a bank (e.g., bank 130 of FIG. 1) using communication interface 205 and via a network (e.g., networks 120 and/or 140 of FIG. 1). Memory 203 may be configured to store a variety of information including the aforementioned computer-readable instructions, funds balance data, reconciliation data, user account information and the like. Additionally, memory 203 may include non-volatile and/or volatile memory. One or more databases may be stored in the memories 108, 112, and 116.

Cash recycler 200 may further provide display 213 to present data and/or messages to a user. For example, display 213 may be configured to display a recycler balance, a transaction interface, a current deposit count, security options, transportation options and the like. One or more input devices 254 such as a keypad, keyboard, mouse, touchscreen, fingerprint scanner, retinal scanner, proximity card reader, RFID scanner and/or writer, magnetic card reader, barcode reader, and/or combinations thereof, or any other type of input device or reader capable of inputting, reading, or scanning indicia or information, may also be included in or connected to recycler 200. One or more printers 256 may also be included in or connected to recycler 200 for printing receipts and notifications as well.

In cash recycler 200, stackers 217 and cartridges 215 are configured to store currency. Currency may be inserted through input slot 209 and withdrawn through withdrawal slot 211. Stackers 217 may be used to store and organize currency based on denomination. For example, all $5 bills may be stored in stacker 2 (i.e., stacker 217B) while all $20 bills may be stored in stacker 3 (i.e., stacker 217C). Cartridges 215A and 215B, on the other hand, may be used to store overflow currency and/or currency for transport. Thus, if stackers 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and stackers 217 may further be removable for easier access or transport. In some configurations, RSMs (not shown) may be used instead of or in addition to stackers 217.

Scanning unit 207 may be configured to scan each bill or currency that is inserted into recycler 200. Scanning unit 207 may be configured to detect defects, counterfeits, denomination, type of currency (e.g., which country the currency originates from) and the like. Scanning unit 207 may further be configured to refuse money (either through input slot 209 or withdrawal slot 211) if it cannot be properly recognized or if the currency is deemed to be counterfeit. Scanning unit 207 may send such data to processor 201 which may, in turn, save the data in memory 203.

Further, recycler 200 may include one or more mechanical or electromechanical systems (not shown) for automatically transferring currency between stackers 217, cartridges 215, input slot 209 and withdrawal slot 211 in recycler 200. For example, currency may automatically be withdrawn from stackers 217 and directed into cartridge 215A for storage using a series of motorized rollers. In another example, currency stored in cartridge 215A may be withdrawn and organized and stored into stackers 217 according to denomination. Using such systems to facilitate the automated movement of currency between storage components and other portions of recycler 200 may provide efficiency and security by alleviating some of the need to manually handle currency stored within recycler 200.

Figure 3:
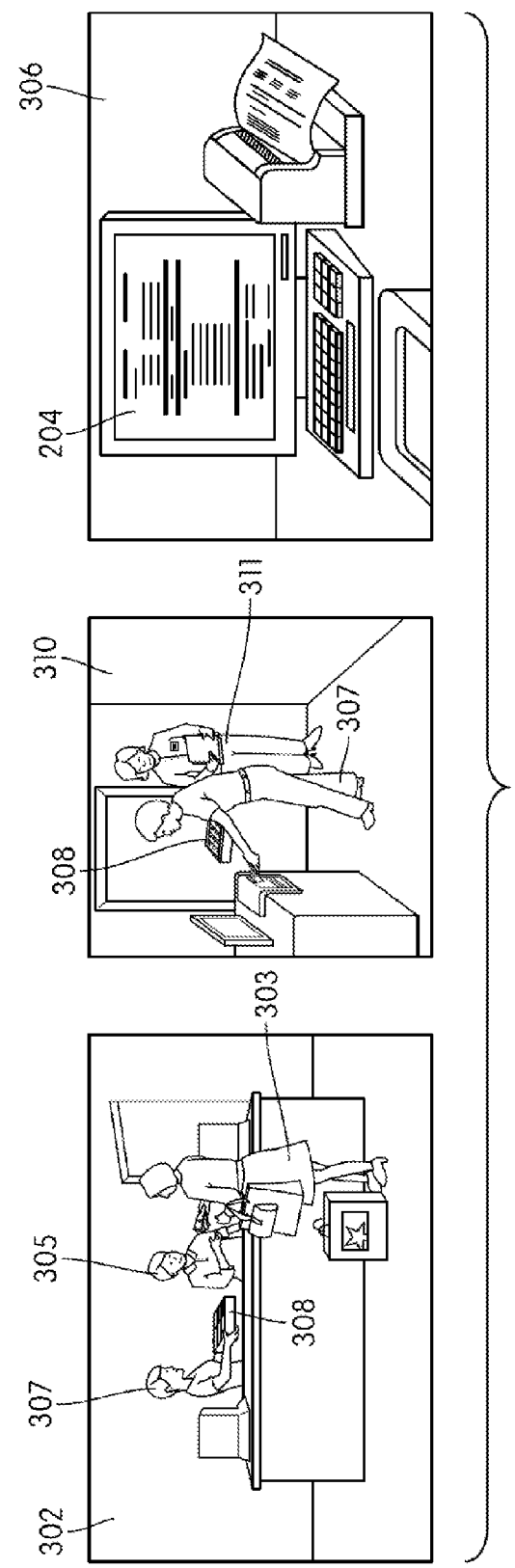
FIG. 3 illustrates various features of cash recyclers used in various aspects of the invention.

FIG. 3 illustrates various features of cash recycler, such as cash recycler 200 of FIG. 2, used in various aspects of the invention. The images in FIG. 3 depict use of a single cash recycler 200 in a retail environment. The retail owner may have a cash recycler 200 located in each of their stores. In an aspect of the invention, summary information for the retail owner's stores may be available via an interface to the financial institution. In another embodiment, access to summary information may be available directly from each of the cash recyclers 200.

In FIG. 3, image 302 depicts customer 303 paying cash to a retail employee such as store cashier 305 for a purchase. Another store cashier 307 at a recently closed cash register may be carrying a cash drawer or till 308 to a back office for reconciliation. In image 310, store cashier 307 may load currency from cash register till 308 into cash recycler 200. In addition, store cashier 307 may also deposit other paper forms of payment received from customer such as checks. An office manager 311 may be supervising cashier 307 during the loading of cash register till 308 into cash recycler 200. Moreover, upon the start of a shift a cashier may fill his/her cash register till with a designated amount of currency dispensed from cash recycler 200.

In image 306 of FIG. 3, a display screen (e.g., display 213 of cash recycler 200 of FIG. 2) may show the total amount entered into cash recycler 200 from till 308. The display screen 213 may breakout the amount entered into cash recycler 200 by denomination and by each cashier. The total amount deposited and withdrawn from cash recycler 200 may be shown on display screen 213.

Figure 4:
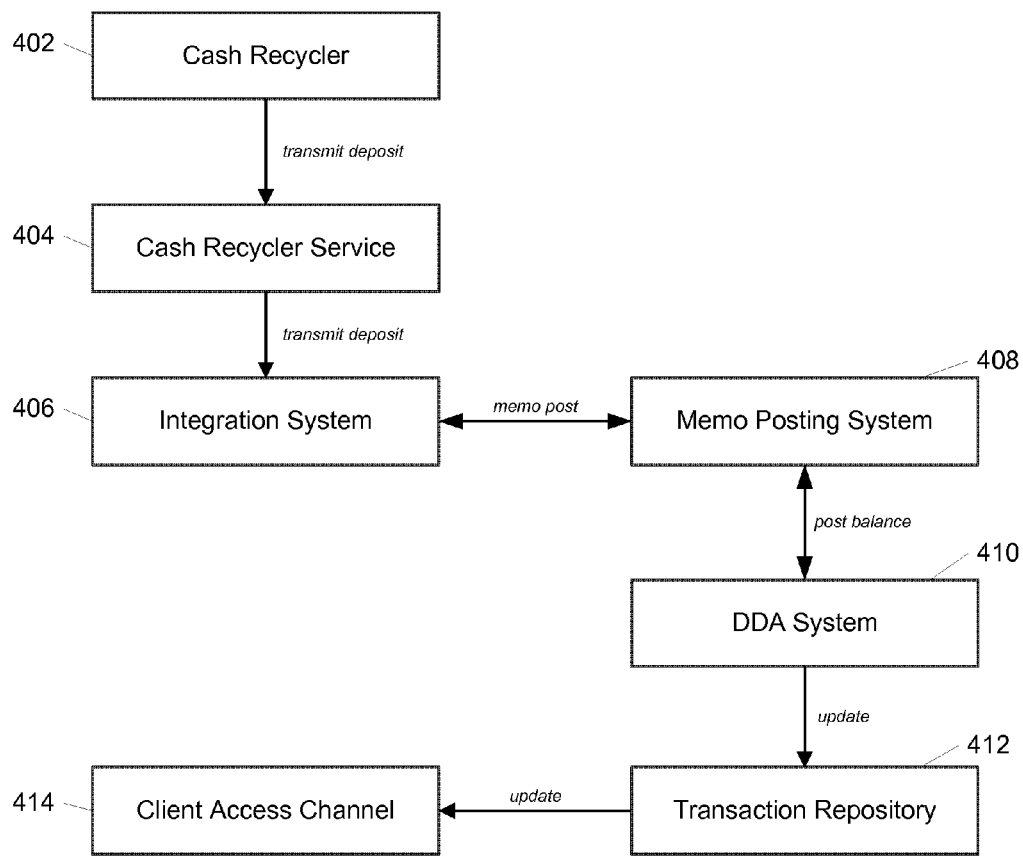
FIG. 4 illustrates a system configuration that may be used in accordance with an aspect of the invention.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location (e.g., a retail store) to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

According to one aspect, cash recyclers such as cash recycler 102 (FIG. 1) and 200 (FIG. 2) and other cash handling devices may facilitate real-time recognition of funds. In particular, funds deposited at a recycler or other cash handling device at a client site may be recognized by a bank at the time the deposit is made. Recognition refers to the real credit (i.e., not provisional) of deposited funds into a client's account. In contrast to current systems, there is no delay between a deposit of funds and when the funds and transaction data are submitted to the bank for recognition. Thus, instead of having to wait until the end of the day or another prescheduled time for deposits and/or withdrawals to be recognized by the bank, each deposit is processed for recognition in real-time. Data regarding the withdrawal or deposit transaction may be transmitted through a data network to the bank for recognition and processing. Providing real-time recognition offers many advantages including the ability for a client to withdraw the same currency that was earlier deposited for use in the client's operations, all at the client site and without having to first transport the deposited funds to the bank for recognition. Currency recyclers, recycling management and recognition of funds are further described in U.S. application Ser. No. 11/614,656, entitled "Commercial Currency Handling and Servicing Management," filed on Dec. 21, 2006, and U.S. application Ser. No. 12/241,385, entitled "Immediate Recognition of Financial Transactions," and filed on Sep. 30, 2008, the content of each being incorporated herein by reference in its entirety.

In many retail organizations, an employment hierarchy exists to insure that the retail organization is operating efficiently. For example, a business such as a retail store may have a manager that oversees day-to-day operations of the store and that manages several lower level employees such as shift supervisors, cashiers, inventory staff, accountants and the like. On some occasions, a manager or other employee may need to perform certain transactions or duties on behalf of another employee. For example, a manager or cash room employee may wish to prepare tills and assign registers prior to cashiers arriving in the morning to increase the speed with which a retail store is able to begin servicing customers.

Figure 5:
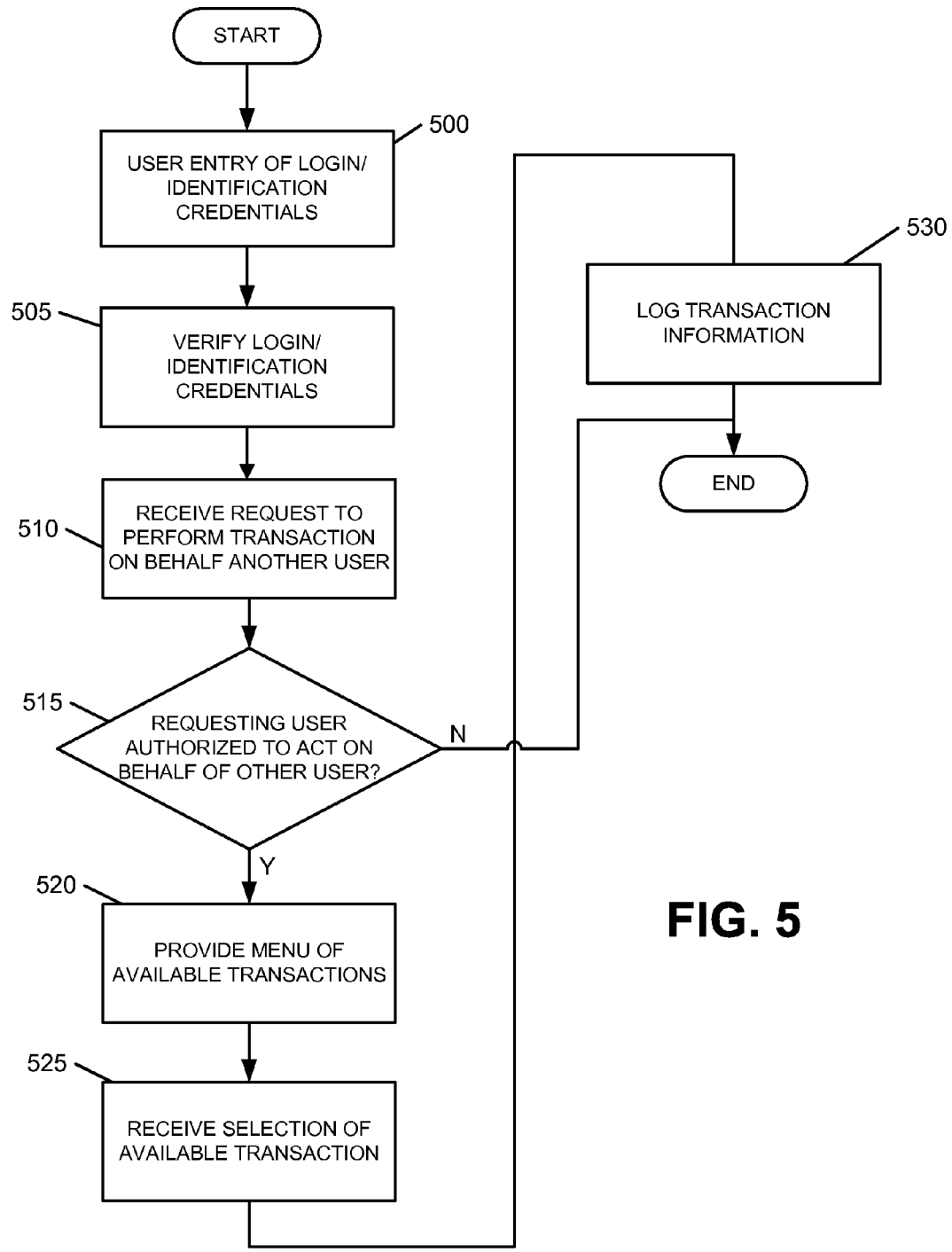
FIG. 5 illustrates an example method for a user to conduct a transaction on behalf of another user according to one or more aspects described herein.

FIG. 5 illustrates a method whereby a user of a cash handling device such as currency recycler 200 may access transaction capabilities and perform transactions on behalf of a another user. In step 500, a first user may enter user login credentials into the cash handling device to identify himself or herself. The login credentials may include a user ID, retinal identification, voice identification, a password, fingerprint information, information scanned from a magnetic strip of a keycard, data stored on a radio frequency ID (RFID) tag or the like. In step 505, the cash handling device may verify the login credentials and provide a menu screen to the user upon successful verification. In step 510, the cash handling device may receive a request to perform a transaction on behalf of another user. In one example, the user may have selected a proxy transaction option on the menu screen. Upon receiving the request, the cash handling device may determine whether the requesting user is authorized to act on behalf the other user in step 515. The determination may include evaluating whether the requesting user has sufficient administrative rights, whether the other user has given the requesting user authorization to act on behalf of him or her and/or combinations thereof. By way of example, a manager may be authorized to conduct transactions on behalf of all other users of lower rank or position regardless of who the other users have designated as allowable proxies. Alternatively or additionally, a cashier may be authorized to conduct transactions on behalf of those that have specifically designated the cashier as an acceptable proxy.

If the requesting user is authorized, the cash handling device may provide a menu of available options (e.g., transactions) from which the requesting user may select in step 520. The menu of available options may be determined based on the requesting user's role (e.g., title, position), transaction capabilities designated by the other user and the like. In one example, the requesting user's role may determine which transaction capabilities are accessible for the other user. If the requesting user is a manager, for instance, the user may be allowed to access all managerial functions such as conducting deposits, withdrawals, shift changes and the like. In another example, a requesting user might only be provided transaction capabilities designated or selected by the other user. In step 525, the requesting user may select a transaction capability and perform a corresponding transaction on behalf of the other user. Transaction capabilities may include obtaining a cash till, depositing funds, reconciling funds, selecting a workstation (e.g., a cash register) and the like. Thus, in one example, a manager at a retail store may assign employees to cash registers and obtain cash tills for their stations. Such an ability may allow the manager to speed up the opening of a retail store. In another example, a manager or an employee completing his or her shift may deposit funds or perform a change order on behalf of another employee so that the other employee does not have to leave his or her station, thus reducing the amount of potential downtime of the other employee and/or his station.

Upon completion of the transaction, the cash handling device may record the transaction in a database in step 530. The record may include the identity of the requesting user and the identity of the user on whose behalf the transaction was conducted. By recording both users' identity and the transaction information, an auditor may be able to determine where funds might have been lost or where discrepancies arose based on who conducted the transaction rather than for whom the transaction was conducted.

If it is determined that the requesting user is not authorized to act on behalf of the other user in step 515, information may be recorded in the transaction log indicating that an unauthorized attempt was made (e.g., in step 530). An error message may also be generated and presented to the user. Optionally, if a specified number of unauthorized attempts are made, then an alert could be generated. The alert may be send to an employee's device or to a general alarm. Wireless alerts, for example, are described in U.S. application Ser. No. 12/277, 876, entitled "CASH HANDLING DEVICE HAVING ALERT SYSTEM," and filed on Nov. 25, 2008, which is hereby incorporated by reference in its entirety.

In one or more configurations, the cash handling device may require that the requesting user login or enter an authorization code for each transaction being conducted on behalf of another user. Such a feature may prevent unauthorized transactions on behalf of other users if the requesting user forgets to log out or otherwise sign off from the cash handling device. Alternatively, the cash handling device may allow a user to conduct multiple transactions on behalf of another user without requiring entry or re-entry of an authorization code.

Additionally or alternatively, in the example where a manager may assign workstations to employees, the cash handling device may optionally transmit a signal to the workstations specifying the assigned employee. The workstation might then be locked out to everyone but the assigned employee for the specified shift or period of time.

Figure 6:
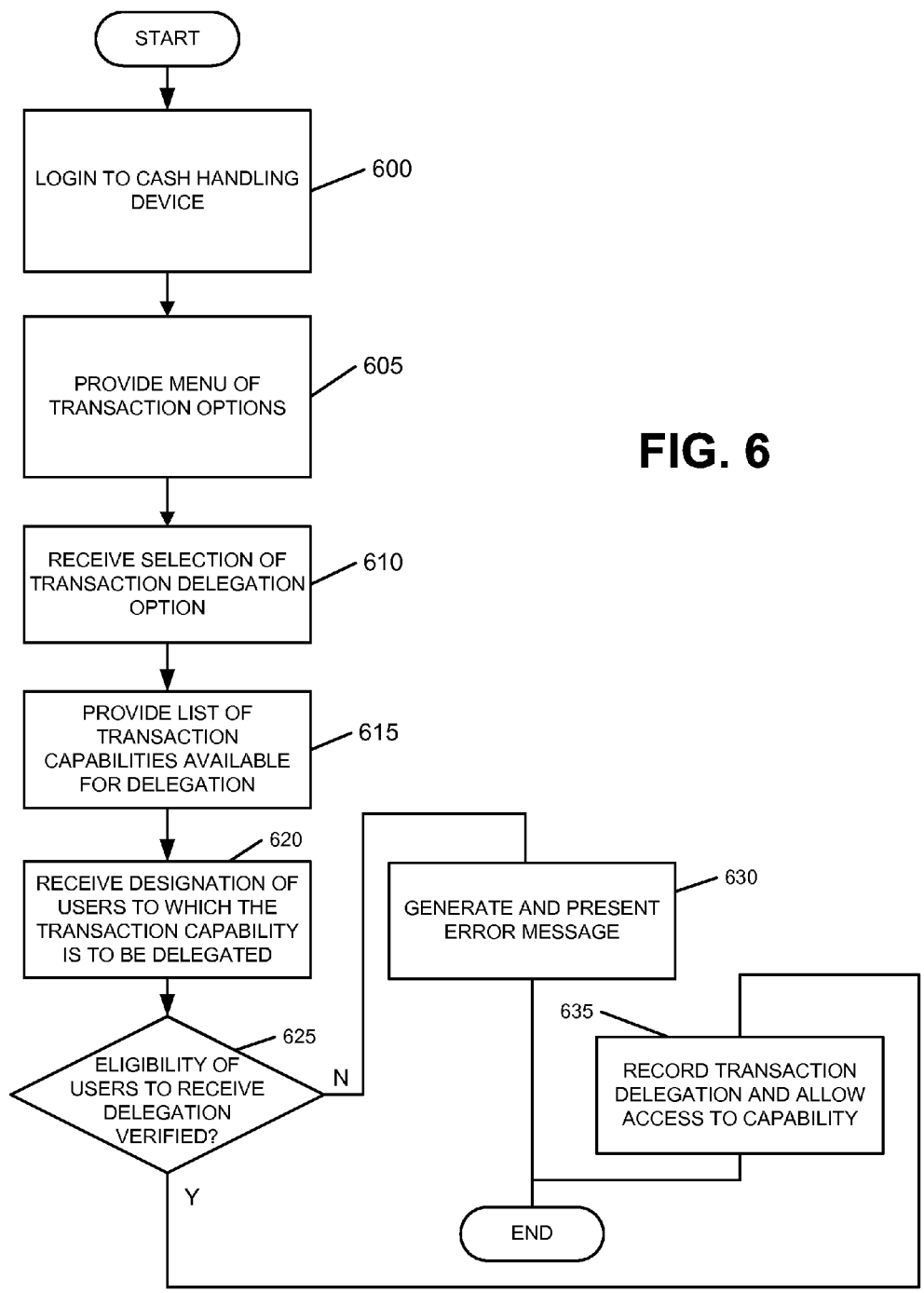
FIG. 6 illustrates an example method of delegating transaction capabilities to other users according to one or more aspects described herein.

FIG. 6 illustrates an example method by which a user may delegate transaction capabilities to one or more other users. In step 600, a user may login to a cash handling device such as a cash recycler. The cash recycler may provide, in step 605, multiple transaction options including an account management option, deposit funds, withdraw funds, check device balance, delegate transaction capabilities option and the like upon login. In step 610, the cash handling device may receive a selection of a transaction capability delegation option. In step 615, the cash handling device may provide a list of transaction capabilities that may be delegated to other users. In one or more arrangements, a manager or supervisor may designate some transactions as being able to be delegated while others might not be eligible for delegation. For example, a manager may specify that the ability to deposit funds may be delegated while specifying that withdrawal transactions may not be delegated.

Once the user has selected one or more transactions to delegate, the cash handling device may request and receive a designation of users to which the transaction capabilities are to be delegated in step 620. In step 625, the cash handling device may verify that the selected users are eligible or authorized to receive delegated transaction capabilities. For example, some users might be on probation or be in a training period, during which they might not be allowed to receive delegated transaction capabilities. If the selected users are eligible or authorized, the cash handling device may record the delegation and allow the selected users access to the transaction capability in step 635. Otherwise, an error message may be generated and presented to the user in step 630.

According to one or more aspects, a transaction performed on behalf of another user may be subject to transaction limitations of the user on whose behalf the transaction is being performed. Thus, if a manager is withdrawing money for a cashier's till, the manager might only be allowed to withdraw up to a limit of the cashier even if the manager has a higher or unlimited withdrawal limit. Other limitations may include a frequency of transaction and a time of transaction.

According to at least one configuration, delegation of transaction capabilities may require the authorization or approval of a financial institution associated with the cash handling device or business. For example, a financial institution holding an account of a business may be given final approval authority for all requests to delegate transactions or to perform transactions on behalf of another user. Thus, proxy transaction and transaction delegation requests may be transmitted to the financial institution for approval.

Figure 7:
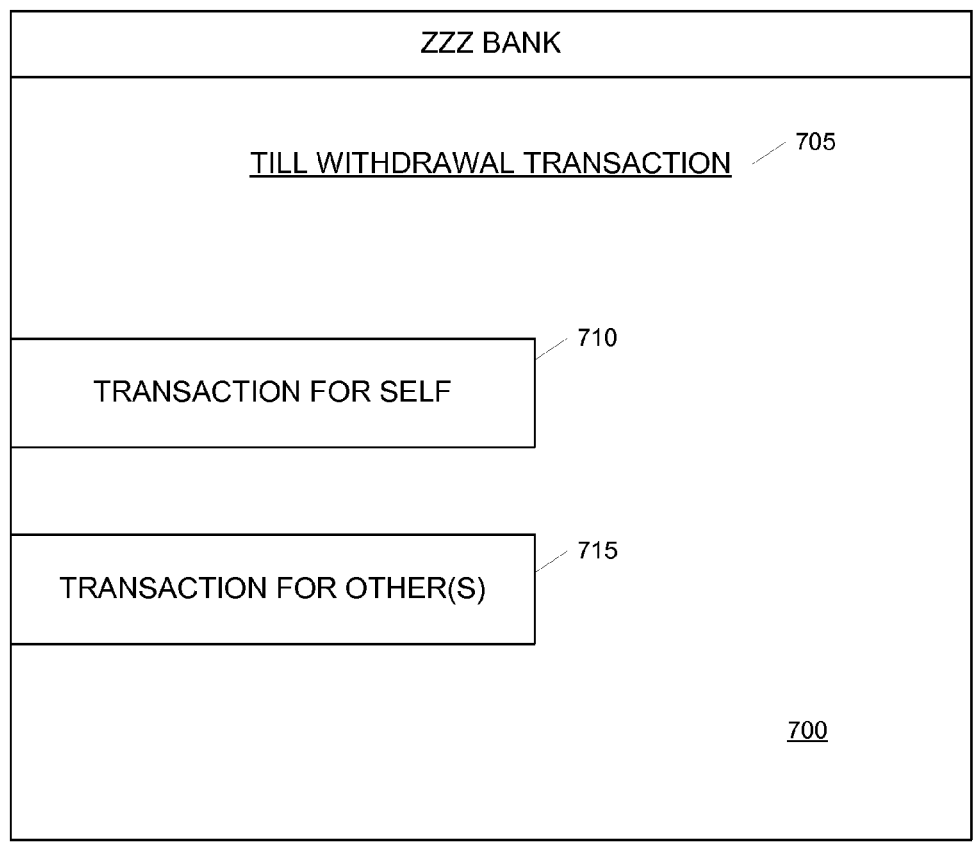
Figure 9:
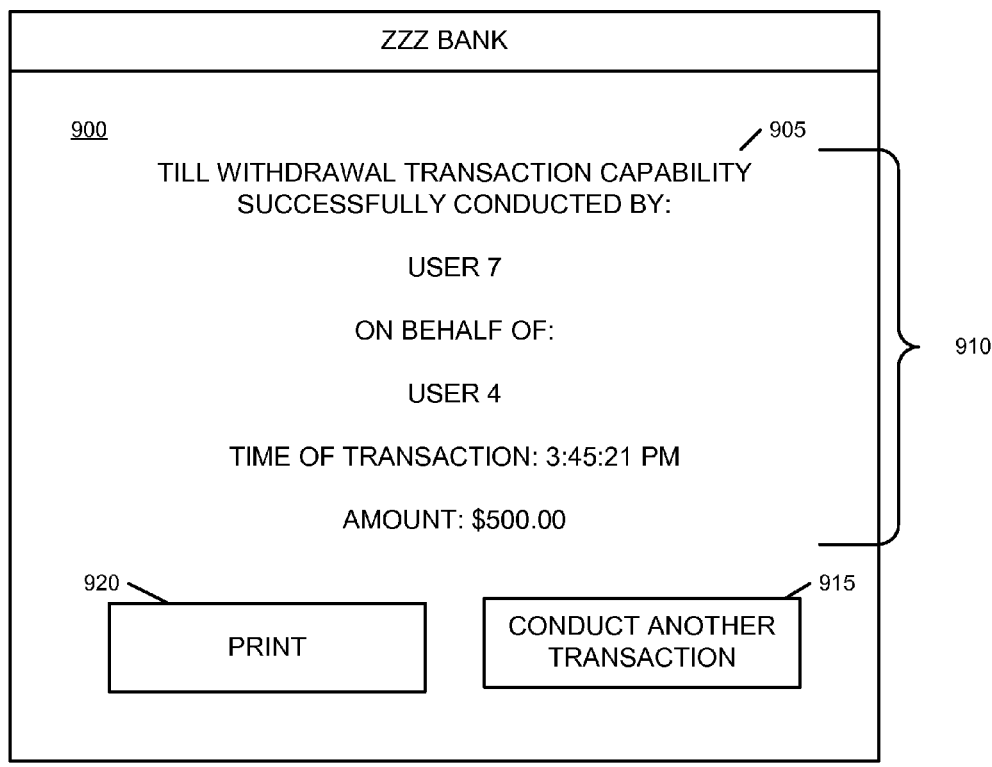

FIGS. 7-9 illustrate example user interfaces in which a user may choose to conduct a transaction on behalf of another user. In FIG. 7, for example, interface 700 illustrates that a user has selected a till withdrawal transaction and is now being prompted to select whether the transaction is for himself or herself or on behalf of another user. In particular, interface 700 may identify the transaction type in a title bar 705 and include options 710 and 715 for selecting a transaction entity. Option 710, for instance, allows a user to perform a transaction for himself or herself while option 715 allows a user to select another user for which to perform the transaction.

FIG. 8 illustrates an example interface 800 in which the user has elected to conduct a transaction on behalf of another user (e.g., by selection option 715 of FIG. 7). Interface 800 includes a drop down list 805 for selecting an individual for which the transaction is to be performed. The drop down list 805 may be populated with all users or with users that have delegated the particular transaction capability to the operating user. Interface 800 may further include a passcode or authorization code entry field 810 requiring the operating user to re-verify his or her identity before the operating user is allowed to conduct the transaction on behalf of a selected user. In particular, once the operating user has selected a user and entered a proper passcode, the cash handling device may allow the user to conduct the transaction on behalf of the selected user. Information toolbar 815 may display the operating user's name, a current time, a title or position of the user and the like. A back option 820 may allow the operating user to return to a previous screen if, for example, the operating user selected the incorrect user.

FIG. 9 illustrates an example interface 900 providing a confirmation message 905 indicating that the transaction has been successfully conducted on behalf of the selected user. Additionally, a confirmation information field 910 may include transaction data such as identification of the operating user, identification of the user for which the transaction was conducted, a time of the transaction, a type of transaction, an amount of the transaction and/or combinations thereof. An option 915 may be provided for conducting another transaction. A print option 920 may also be included to allow a user to generate, print and/or e-mail a receipt of the transaction.

Figure 10:
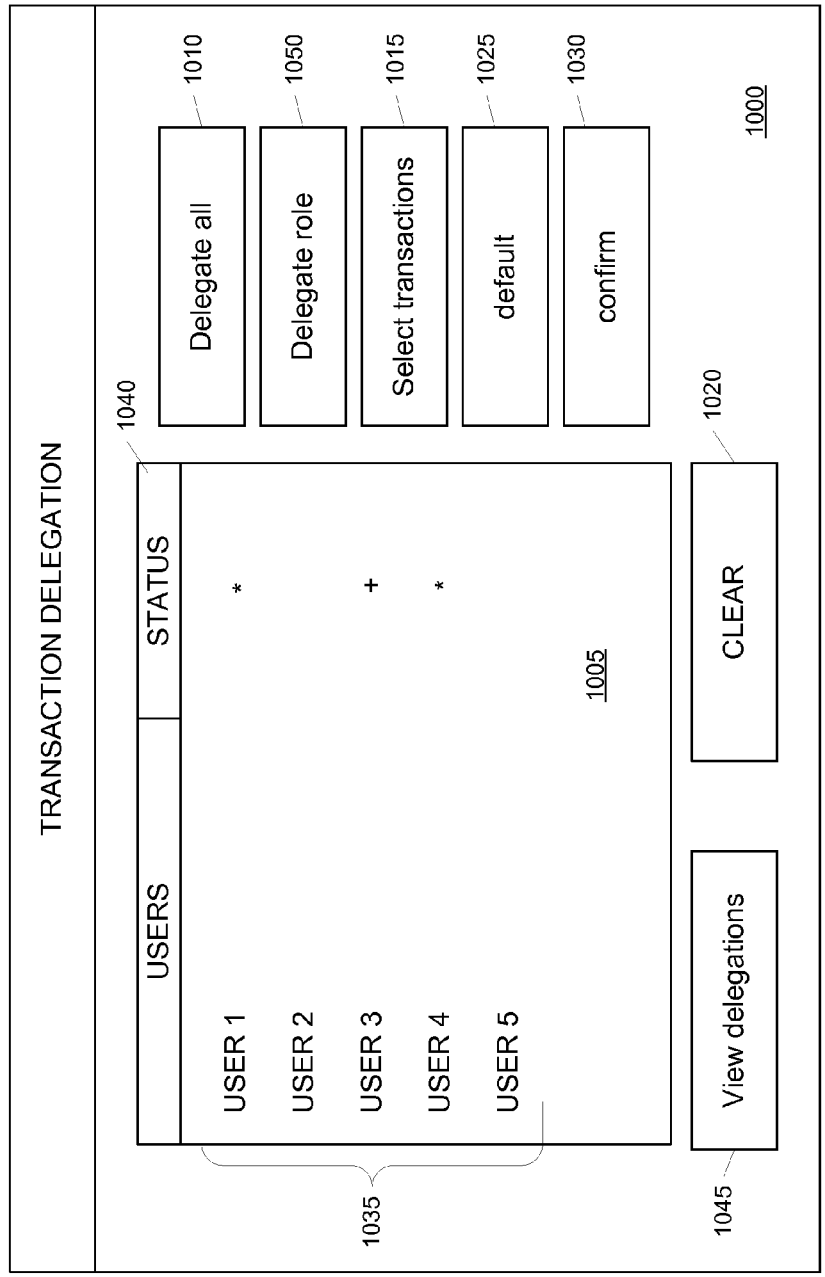
FIGS. 10 and 11 illustrate example user interfaces through which a user may delegate transaction capabilities according to one or more aspects described herein.
Figure 11:
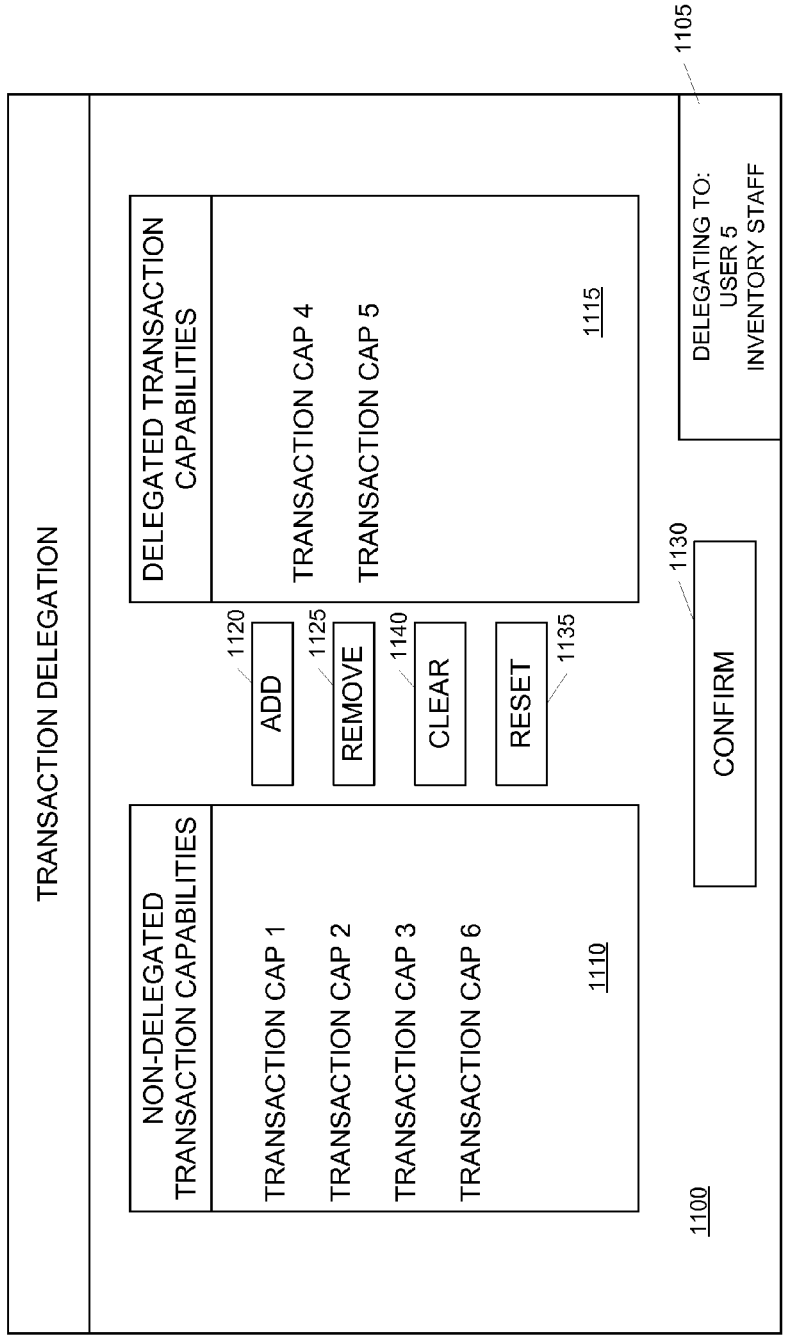

FIGS. 10 and 11 illustrate user interfaces through which a user may delegate transaction capabilities to one or more other users. FIG. 10, for example, illustrates transaction capability designation interface 1000 that includes a list 1005 of other employees or users associated with the organization or business, delegate all option 1010, select transaction capability option 1015, clear option 1020, default option 1025 and confirm option 1030. List 1005 may list each other employees name or identification number 1035 followed by a delegation status field 1040. Delegation status field 1040 may provide an indication of what type or how many transaction capabilities have been delegated to the corresponding user. For example, delegation status field 1040 may include a plus sign (+) to indicate that the user has been given rights to access all transaction capabilities on behalf of the current user. In another example, delegation status field 1040 may be populated by an asterisk (*) to indicate that the user has been given rights to access at least one but less than all transaction capabilities. A view delegations option 1045 may be provided to allow a user to view the transaction capabilities that have been delegated to a particular user. If a user has not been delegated any transaction capabilities, delegation status field 1040 may be empty or may include another symbol. Other symbols and indicators may be used as desired.

Delegate all option 1010 may be a shortcut option that allows a current user to delegate all transaction capabilities to another user. In the above examples of delegation status field 1040 indicators, a plus sign may be populated in field 1040 upon a current user selecting the delegate all option 1010. Clear option 1020, on the other hand, may be used to clear all delegations made to a selected user in the current session. Alternatively or additionally, if no user is selected, clear option 1020 may clear all delegations to users made in the current session. Default option 1025, on the other hand, may reset the delegations to a default configuration. Default configurations may be defined by the organization or business, by the system (e.g., no delegated transaction capabilities), a manager or the like. Select transaction capability option 1015 may be used to select particular transaction capabilities to assign a selected user, as discussed in additional detail with respect to FIG. 11. Once transaction capability delegations have been completed, a user may finalize the changes by selecting confirm option 1030.

Delegate role option 1050 may be included so that an employee may delegate his or her role to another user. A role may include a set of transaction capabilities, privileges, authorizations and the like. Accordingly, delegating a role may automatically delegate the set of transaction capabilities associated therewith (i.e., a user does not have to manually designate each privilege associated with the role).

FIG. 11 illustrates an example interface 1100 through which a user may delegate particular transaction capabilities to another user. Interface 1100 includes information bar 1105 which indicates the user to which transaction are to be delegated. Information bar 1105 may also specify a title or position the other user holds. Interface 1100 may further include a list of transaction capabilities that the current user has or that may be delegated. For example, interface 1100 might only display those transaction capabilities that are eligible or available for delegation. Interface 1100 may include two lists 1110 and 1115. One list, e.g., list 1110, may include all transaction capabilities that have not been delegated while the other list, e.g., list 1115, includes all transaction capabilities that are currently delegated to the other user. Using add option 1120 and remove option 1125, a user may move transaction capabilities between the two lists 1110 and 1115. Once the user has finalized his or her selections, the changes to the transaction delegations may be finalized by selecting confirm option 1130. Alternatively, a reset option 1135 may be used to reset the delegations to a prior configuration. A clear option 1140 may also be included to clear all delegated transaction capabilities (e.g., from list 1115).

Figure 12:
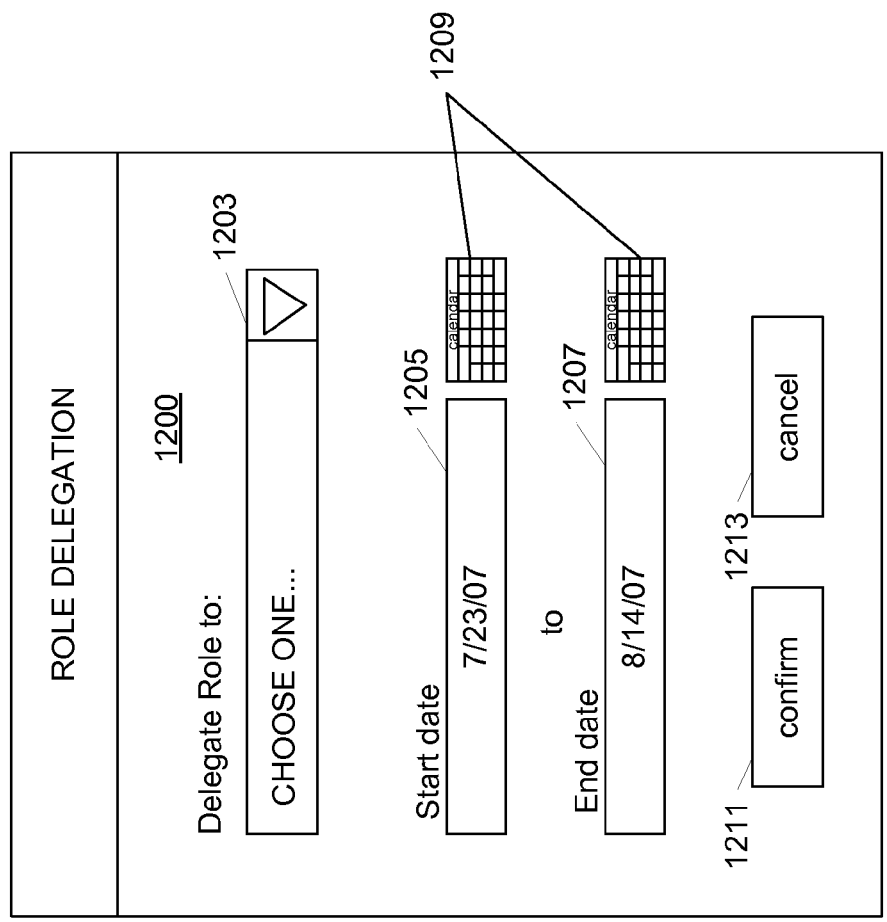
FIG. 12 illustrates an example role delegation interface according to one or more aspects described herein.

FIG. 12 illustrates an example interface for delegating user roles. Role delegation interface 1200 includes a drop down menu 1203 for selecting a user or employee to which the present user's role is to be delegated. In one example, a manager taking sick leave may delegate his role to an assistant manager for the duration of the sick leave. The user may further specify a begin date and an end date for the delegation using fields 1205 and 1207, respectively. Instead of or in addition to typing in a date, a user may use the calendar option 1209 to open up a pop-up calendar and choose a date therefrom. Once the dates and the delegate have been selected, the user may confirm 1211 the delegation. Alternatively, if the user changes his or her mind or has made a mistake, cancel option 1213 may be used to return to a previous interface. A role may include a set of transaction capabilities, authorizations, responsibilities and the like.

Begin and end dates may define the dates during which the role delegation is effective. For example, a user may set a future begin date so that the user does not need to worry about setting the delegation later. The cash handling device may automatically activate the delegation upon reaching the date. Similarly, upon reaching the end date, the cash handling device may automatically deactivate or end the delegation. Accordingly, a user does not need to manually remove delegations.

The methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disc storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements in the other embodiments. It will also be appreciated and understood that modifications may be made without departing from the true spirit and scope of the present invention. The description is thus to be regarded as illustrative instead of restrictive on the present invention.

We claim:

1. A method comprising:
receiving, by a cash handling device having at least one processor, identification credentials for a first user of a cash handling device;
receiving a request from the first user to conduct a transaction on behalf of a second user, wherein the transaction corresponds to a transaction capability of the second user, wherein the transaction capability includes selecting a register for use during a shift;
determining, by the cash handling device, whether the first user is authorized to conduct the transaction on behalf of the second user; and
in response to determining that the first user is authorized to conduct the transaction on behalf of the second user, providing, by the cash handling device, access to the transaction capability to the first user.

2. The method of claim 1, further comprising:
receiving a user instruction from the first user, the user instruction corresponding to a request to perform an action associated with the transaction capability;
executing the action; and
storing an indication that the action was performed according to the user instruction from the first user on behalf of the second user.

3. The method of claim 1, wherein the transaction capability includes dispensing funds to a register till.

4. The method of claim 1, wherein the transaction capability includes depositing funds into the cash handling device.

5. The method of claim 1, wherein the transaction capability includes reconciling transactions and funds for the second user.

6. The method of claim 1, wherein the transaction capability includes reconciling transactions and funds for a specific device.

7. An apparatus comprising:
memory storing computer readable instructions that, when executed, cause the apparatus to:
receive identification credentials for a first user of a cash handling device;
receive a request from the first user to conduct a transaction on behalf of a second user, wherein the transaction corresponds to a transaction capability of the second user, wherein the transaction capability includes selecting a register for use during a shift;
determine whether the first user is authorized to conduct the transaction on behalf of the second user; and in response to determining that the first user is authorized to conduct the transaction on behalf of the second user, provide access to the transaction capability to the first user.

8. The apparatus of claim 7, wherein the transaction capability includes dispensing funds to a register till.

9. The apparatus of claim 7, wherein the transaction capability includes depositing funds into the cash handling device.

10. The apparatus of claim 7, the computer readable instructions, when executed, further causing the apparatus to:
receive a selection of the register from the first user; and
transmit a signal to the register indicating an assignment of the second user to the register.

11. The apparatus of claim 10, wherein the signal is configured to lock the register to the second user thereby preventing other users from accessing the register.

12. The apparatus of claim 7, wherein the transaction capability includes reconciling transactions and funds for a specific device.

* * * * *